United States Patent [19]
Fleischer et al.

[11] Patent Number: 4,621,011
[45] Date of Patent: Nov. 4, 1986

[54] AGGLOMERATED CELLULOSIC PARTICLES

[75] Inventors: Glen R. Fleischer; Barry B. Glashagel, both of Neenah; Elwood W. Harke, Kimberly, all of Wis.; Robert C. Sokolowski, Alpharetta, Ga.; James E. Fay, Neenah, Wis.

[73] Assignee: Kimberly-Clark Corporation, Neenah, Wis.

[21] Appl. No.: 782,242

[22] Filed: Sep. 30, 1985

Related U.S. Application Data

[63] Continuation-in-part of Ser. No. 602,276, Apr. 24, 1984, abandoned, which is a continuation-in-part of Ser. No. 482,366, Apr. 5, 1983, which is a continuation-in-part of Ser. No. 463,100, Feb. 2, 1983, abandoned.

[51] Int. Cl.$^4$ .............................................. B32B 23/00
[52] U.S. Cl. ........................................ 428/221; 119/1; 428/326; 428/357; 428/372; 428/398; 428/400
[58] Field of Search .................... 119/1; 428/221, 357, 428/372, 326, 398, 400

[56] References Cited

U.S. PATENT DOCUMENTS

| | | | |
|---|---|---|---|
| 3,003,911 | 10/1961 | Lindstrom et al. | 162/100 |
| 3,256,857 | 6/1966 | Harras | 119/1 |
| 3,828,731 | 8/1974 | White | 119/1 |
| 4,157,696 | 6/1979 | Carlberg | 119/1 |
| 4,263,873 | 4/1981 | Christianson | 119/1 |
| 4,305,345 | 12/1981 | Otoguro | 119/1 |
| 4,378,756 | 4/1983 | Whiteman | 119/1 |
| 4,492,729 | 1/1985 | Bannerman et al. | 428/326 |
| 4,497,688 | 2/1985 | Schaefer | 119/1 |
| 4,560,527 | 12/1985 | Harke et al. | 119/1 |

*Primary Examiner*—James J. Bell
*Attorney, Agent, or Firm*—Donald L. Traut; Jeremiah J. Duggan

[57] ABSTRACT

A cellulosic particle, especially useful as a cat litter, is manufactured by agglomerating a fibrous cellulosic feed material in the presence of water, compacting the surface of the agglomerated particles, and drying the particles.

39 Claims, 1 Drawing Figure

FIBERIZATION 10
MIXING 12
HYDRATING 14
AGGLOMERATING 20
DRYING #1 22
SEPARATING 24
DRYING #2 26
FLATTENING 28
PACKAGING 30

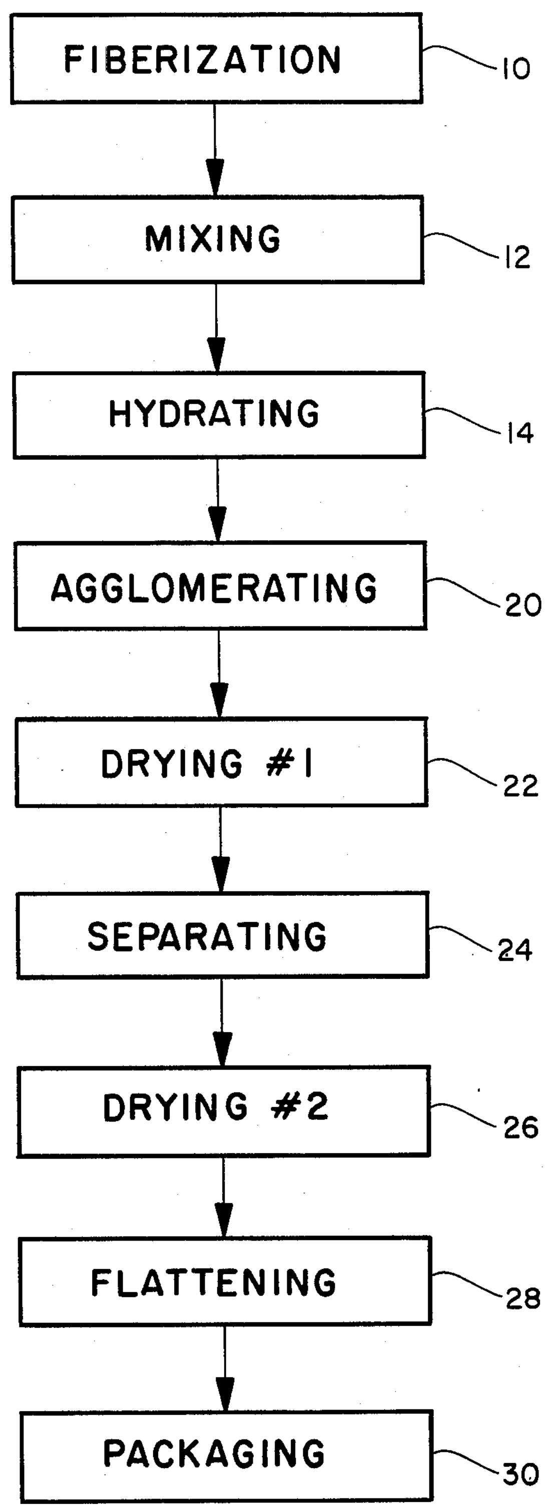
FIBERIZATION
10
MIXING
12
HYDRATING
14
AGGLOMERATING
20
DRYING #1
22
SEPARATING
24
DRYING #2
26
FLATTENING
28
PACKAGING
30

AGGLOMERATED CELLULOSIC PARTICLES

This application is a continuation-in-part of application Ser. No. 602,276 filed Apr. 24, 1984 now abandoned, which is a continuation-in-part of application Ser. No. 482,366 filed Apr. 5, 1983, which is a continuation-in-part of Ser. No. 463,100 filed Feb. 2, 1983 now abandoned.

BACKGROUND OF THE INVENTION

This invention relates to sorping particles and particular agglomerated cellulosic particles which have various industrial and household uses such as for the sorption of oil, grease and the like from floors and elsewhere where such materials represent a safety hazard. In addition, because of their water sorbing and deodorizing characteristics, the particles have been found particularly useful as litter or bedding for animals. More particularly, although not exclusively, it may be adapted to a litter for domestic pets such as cats, dogs, mice, rats, gerbils and the like. The invention also relates to a bed of such particles.

Commercially available cat litters frequently contain clay. Clay litters are a disadvantage since they are heavy, dusty, and stick together to form clumps in the bottom of the litter box after use. In addition, because clay litters have low absorbency, cat urine tends to pool on the bottom of the litter box and creates an odor problem as bacterial growth increases.

In an attempt to overcome the disadvantages of clay litters, other commercially available cat litters have been made from cellulosic materials such as newsprint and alfalfa. These products contain water-soluble binders and are produced by extrusion and pelletization of the extrudate. However, such products also suffer certain disadvantages. In particular, during use the pellets swell and break apart, resulting in a mess in the litter box. Also, these products are dusty in spite of the presence of binders because the exposed ends of the pellets are subject to attrition during shipment and use.

U.S. Pat. No. 3,789,797 discloses an animal litter which is prepared by mixing ground alfalfa screened through a 50 mesh screen with 2 to 50 percent by weight bentonite. The resulting mixture is mixed with a binder such as molasses, wood molasses, modified starches or a non-toxic glue and then pelletized and dried. The pellets contain chlorophyll which is disclosed as an effective odor control of animal waste and the particle mixture is disclosed as not readily tracked from the litter area by the animal. The moisture level of the mixture before pelletizing is about 5 to 60 percent. The pellets are tumbled to gradually be enlarged by snowballing to the desired size but the pellet is not compacted. The final pellet contains about 5 to 8 percent moisture. The dried pellets are then screened to remove large particles and fines from the pellets. However, the fines are present in the final product since particles tend to disintegrate during normal shipment.

U.S. Pat. No. 3,256,857 discloses an animal bedding material comprising wood particles of substantially uniform shape and size, the size being generally 1/10" by 1/10", preferably 1/20" by 3/10" and adapted to be sifted through a size 8 mesh screen and retained by a size 16 mesh screen.

U.S. Pat. No. 3,828,731 discloses an animal litter comprising pieces and shavings of substantially pure organic cellulosic material having a high inherent characteristic for liquid absorption and including at least one microbial inhibitor. The cellulosic material is further described as including alpha cellulose, sulphite cellulose. The inhibitor is described as including benzaldehyde green, rose bengal, sodium propionate, calcium propionate, quaternary ammonium compounds, and combinations thereof. The litter could also include a surface active agent from selected cationic, anionic or nonionic surface active agent groups.

U.S. Pat. No. 4,459,368 discloses a sorbing and deodorizing composition comprising particulate mixtures of articulate synthetic and clay particle sorbents. The size of the clay particles was considered significant and preferred to be such that no more than about 60 weight percent passed through a 2 mesh sieve screen and was retained on a 6 mesh sieve screen. The clays were disclosed to sorb an amount of more than 50 weight percent of the particle.

U.S. Pat. No. 4,459,368, however, indicates that fines should be preferably present; more preferably at least 1 percent by weight of the particles should pass a 40 mesh sieve screen; and most preferably at least 3 to 5 percent of the composition should pass through a 40 mesh sieve screen.

U.S. Pat. No. 4,203,388 discloses an animal litter comprising pelletized and dried cellulose containing rejects, mineral fillers, suitable deodorant materials, such as sodium bicarbonate, chlorophyll, and sodium dehydrogen phosphate in amounts ranging from 1 to 10 percent. The litter could also include bactericides.

U.S. Pat. No. 4,305,345 discloses manufacture of litter particles by adding hot water and aluminum silicate or calcium carbonate (feldspar) to a paper pulp to form a slurry, dehydrating the slurry, forming pulp lumps, rolling the lumps, dehydrating to between 28 and 45 percent solids, rotating the particles and drying the solids to 90 percent solids. The patent discloses as an object the manufacture of platelet-like particles but does not teach such manufacture. The feldspar is added to effect non-sticking behavior of the particles.

U.S. Pat. No. 4,187,803 discloses a process for pelletizing sorptive mineral fines which includes adding sufficient moisture to the particles to occupy the pore space, compactly forming the moistened mineral in pellet form, and then drying the compacted pellets to retain the same absorbent capacity and bulk density as the original material. The sorptive minerals were defined as clays, diatomaceous earth, fuller's earth and bentonite. The patent recognizes the fines which pass through a 20 mesh screen are not satisfactory for a commercial product.

U.S. Pat. No. 3,675,625 discloses an animal litter which produces a fragrant odor when contacted with an aqueous liquid which comprises a high density absorbent with a moisture content of less than 12 percent and a highly polar fragrant odor control agent. The odor control agent comprises about 0/1 to 1 percent of the litter weight. The litter has a particle size capable of passing through a No. 6 Tyler screen and is substantially retained by a No. 35 Tyler screen.

U.S. Pat. No. 3,415,397 discloses a litter material having a particle size ranging from 4 to 20 mesh and having a density of about 3 pounds per $5\frac{1}{2}$ quarts. The litter material consisted of alfalfa, algae, broome grass and timothy grass and a lightweight absorbent of either vermiculite or perlite.

U.S. Pat. No. 3,059,615 discloses treatment of a cellulosic material with a controlled amount of acid to bring the pH of the material to between 2.5 and 3.5. Suitable acids include mineral acids, phosphoric acids and citric acid.

European Application No. 812000142, Publication No. 0039 522 A2 discloses a cellulose/filter material useful for liquid absorbing and shock absorbing which has a dry bulk density not more than 400 kg/m$^3$ and a water content of 0.5 to 10 percent by weight. Preferably the water content is between 5 and 8 percent by weight. The pellets are capable of absorbing 80 to 150 percent of their own weight in oil or 200–300 percent of their own weight in water.

Therefore, it is an object of this invention to provide a particle, especially useful as an animal litter, which is light, substantially dust-free, attrition resistant, bed stable, resistant to flow, absorbent, easy to clean up, and which wicks away free liquid to avoid liquid pooling which in turn mitigates bacterial growth. It is a further object of this invention to provide a particle having other uses such as a floor sweeping material, an oil absorbent, a packing material, a mulch, or a carrier for other materials such as scents, disinfectants, germicides, or the like.

SUMMARY OF THE INVENTION

In general, the invention resides in an agglomerated cellulosic particle, particularly useful as an animal litter. The particles of this invention can be made from fibrous cellulosic waste materials, such as waste paper, newsprint, paper mill reclaimed cellulose fiber, etc., and combinations of these cellulosic waste materials, and therefore provide a means for turning a waste material into a useful product. The particles of this invention are absorbent, light in weight, easily disposable, and exhibit very low dust generation. When heavy moistened, the particles of this invention still maintain their integrity and do not tend to stick together and clump to each other. Even when immersed in water, they retain their integrity after becoming saturated. This characteristic is particularly advantageous when the particles are used as a cat litter.

More particularly, the invention resides in a particle consisting essentially of agglomerated fibers, aggregates of fibers, and/or fiber-sized pieces of a fibrous cellulosic material, the particle having a densified or compacted outer surface or skin which is substantially free of protruding fiber ends and/or fibrils. For purposes herein, "fibrils" are irregular aggregates of fibers and fibrous material. A minor amount of adhesive bonding may also be present due to the inherent presence of binders in the fibrous cellulosic waste materials. Also, the addition of a small amount (less than about 10 weight percent) of a binder such as starch can be tolerated. Preferably, however, the addition of binders is kept to a minimum because of cost and because the particles of this invention remarkably are relatively dust-free and maintain their integrity sufficiently without binders. The shape of the particle is substantially irregular, but is preferably platelet-like as will hereinafter be described. Despite the particle being formed from fibrous cellulosic materials, the compacted surface is relatively smooth. Depending on the nature of the fibrous cellulosic material used to form the particle, the internal structure of the particle can vary. For example, a particle formed of shredded waste paper having pieces of a size on the order of about ¼ inch will have a discernible layered or lamellar structure. On the other hand, if a more finely divided material is used, such as reclaimed cellulose fiber, or waste paper processed through a fine screen, a more homogenous internal structure results. Nevertheless, the rolling action of the agglomeration process still imparts a slight degree of internal orientation to the particle even when very finely divided feed material is used. This orientation appears to be an inherent characteristic of the agglomeration method used to make the particles.

The particle of the invention are formed by (a) agglomerating a moist blend of fibers, aggregates of fibers, and/or fiber-sized pieces of a fibrous cellulosic feed material, such as waste paper and/or paper mill reclaimed cellulose fiber, to form individual agglomerated particles; (b) compacting the surface of the agglomerated particles to form a densified skin substantially free of protruding fiber ends and/or fibrils; and (c) drying the agglomerated particles. Preferably, the particles are slightly flattened prior to final drying to form platelet-like particles which have less tendency to roll and form a stable bed. This is particularly advantageous when the particles are used as an animal litter.

In a still further aspect, the invention resides in a bed of particles within a container, such as a litter box, the particles consisting essentially of agglomerated fibers, aggregates of fibers, and/or fiber-sized pieces of a fibrous cellulosic material wherein the outer surfaces of the particles have a densified or compacted skin which is substantially free of protruding fiber ends and/or fibrils. Preferably the particles have a platelet-like shape. As a cat litter, the particles of this invention exhibit a very low level of dust generation and minimal sticking to the bottom of the litter box in use.

These and other aspects of this invention will be described in greater detail by reference to the FIGURE.

BRIEF DESCRIPTION OF THE DRAWINGS

The FIGURE is a schematic flow diagram illustrating the agglomeration, surface compaction, and drying steps useful for production of particles of this invention.

DESCRIPTION OF THE PREFERRED EMBODIMENT

The particles of the preferred embodiment have shapes which have dimensions measured in the x, y and z planes. The largest dimension for each particle is defined as the x-dimension, the particle size. The largest dimension measured in the remaining two corresponding planes is defined as the y-dimension. The largest measurement in the corresponding z-plane is the z-dimension and defined as the thickness. The x dimension to y dimension ratio is preferably not greater than about 3:1 and the shape is preferably substantially circular. The z/x ratio ranges from about 0.06:1 to about 0.6:1. Preferably the z/x ratio is about 1.15:1 to about 0.5:1.

The improved particle bed will contain particles substantially falling within the particle size range of from about 0.03 inch to about 0.5 inch. Substantially falling within shall be at least about two-thirds by weight of the designated particle size. Preferably the particle size range is from about 0.06 inch to about 0.25 inch. Preferably the bed contains substantial absence of particles having a size less than about 0.01 inch.

The particle size distribution will range such that less than 2.0%, preferably 1.5%, will be retained on a U.S. Sieve #4 and the remaining particles will pass through and be retained in a relatively normal distribution on the intermediate sieves between #4 and #18. Less than 5% of the particles would be retained on a #18 Sieve and 0.1% or less would pass through the #18.

The particles will be attrition resistant such that less than 2% of the particles will disintegrate to the next smaller sieve size when run through a 1000-mile attrition test. More importantly, the attrition test does not produce a measurable increase in dust; i.e., particles retained on U.S. Sieve #140 or smaller.

The particles of this invention will form an improved bed which preferably has a bed stability substantially equal to that of the clay particles. Stability is important since the animals using the particle bed as little dislike sinking in the litter.

Preferably, the bed of cellulose particles comprises additionally synthetic particles. Preferably, the cellulose particles are present relative to the synthetic particles at a volume ratio of about 30:1 to about 15:1. The cellulose particles useful herein have a bulk density of about 0.15 to about 0.9 kg/l. In addition, the particle size distribution of the particles is such that no more than about 60 weight percent of the particles will be retained on a 6 mesh sieve screen. The synthetic particles preferably have a bulk density of about 0.2 to about 2.0 kg/l, and a size distribution such that no more than about 20 weight percent are retained on a 6 mesh sieve screen.

The particulate compositions of the present invention sorb water or oil and exhibit odor abatement properties when used as animal litter.

Useful particles of this invention sorb water or oil in an amount of more than about 50 percent of the weight of the particle. Preferably, the particles sorb an amount of more than about 60 percent of their own weight, and more preferably sorb an amount of more than about 80 percent of their weight in water or oil. Following sorption the particles remain discrete and do not stick or clump together. The particles permit rapid evaporation of liquids and tend to wick the liquids to adjoining particles.

The fragrance may be added to the composition and should comprise from about 0.01 weight percent to about 2.0 percent of the particle composition. The fragrance may be extended by dilutants such as water, diethyl phthalate, dipropyl glycol or diisopropyl adipate or incorporated into a flake made up of materials such as starch.

The particles preferably have a porosity value using a mercury porosimeter of less than about 0.4 cc/g and a density, at 1.8 psi, greater than about 0.9 g/ml.

The particle drying may preferably be stopped at 15 percent to 20 percent moisture with use of a bactericide. The remaining drying to about 5 to 8 weight moisture occurs in the non barrier packaged product.

The FIGURE illustrates a method for preparing particles of this invention, i.e. the steps of agglomerating fibers, aggregates of fibers, and/or fiber-sized pieces of the fibrous cellulosic feed material to form individual agglomerated particles, compacting the surfaces of the agglomerated particles, and drying the particles. As will become apparent from this specification, the steps of agglomeration, surface compaction, and drying are not necessarily accomplished in three separate zones. More typically, one apparatus may simultaneously agglomerate the particles and compact the surfaces of the particles or alternatively compact the surfaces of the particles and simultaneously dry the particles.

Preparation of feed material for the method of this invention includes providing a fibrous cellulosic material suitable as a feed material for agglomeration. "Fibrous cellulosic materials", for purposes herein, are fibrous cellulosic materials which are substantially free of natural binders such as lignin, tars, and pitches naturally present in plant life. These natural binders cause the cellulosic fibers to be stiff and inflexible, which is undesirable for purposes of this invention. These binders are normally removed by extraction in a papermaking pulping process. Therefore, cellulosic materials which have undergone digestion in a pulping operation are particularly suitable. Such suitable materials specifically include waste paper (including newsprint, cardboard, etc.), reclaimed cellulose fiber, and combinations thereof. As used herein, "reclaimed cellulose fiber" is a general term, which includes unused materials from primary tissue mills and other types of papermaking processes and primarily contains short cellulose fibers which have passed through the forming wire of a wet forming papermaking process.

It will be appreciated that the enumerated feed preparation steps are not necessary for all raw fibrous cellulosic materials, such as paper mill reclaimed cellulose fiber, which ca be fed directly into the process of this invention if its water content is not too high to prevent agglomeration. However, paper mill reclaimed fiber can also be subjected to the process of this invention in combination with other raw materials to the extent that its water content does not adversely affect the operations, particularly the fiberization step.

As shown in the FIGURE, the fibrous cellulosic material is fed to a fiberization zone 10 which includes one or more fiberization or attrition devices such as hammermills. The purpose of the hammermills or any other attrition device used herein is to shred or fiberize the raw material into small fiber-sized pieces, including individual fibers and aggregates of fibers. For purposes herein, "fiber-sized" means a size on the order of about $\frac{1}{4}$ inch$\times\frac{1}{4}$ inch or less. As the pieces become larger, it becomes increasingly difficult to process the material into the smooth-surfaced particles described herein. Forced air is continuously directed into the hammermills to keep the material moving through the hammermills. A particular fibrous cellulosic feed material which has been successfully processed through the hammermills, for purposes of illustration, may contain (by weight) 25% newsprint, 60% clay-coated glue-grade waste paper, and 15% primary tissue mill sludge (containing about 75 weight percent water). Paper mill reclaimed cellulose fibers typically contain from about 60 to about 90 weight percent water and therefore could cause plugging in the hammermills if present in too large an amount. Hammermills may plug up if the total moisture content of the fibrous cellulosic material approaches about 20 weight percent or so. It is preferable that the reclaimed cellulose fiber be added to the system after the hammermills to avoid any such problems. If reclaimed cellulose fiber is to be used as the sole feedstock, the feed fiberization step is unnecessary.

The resulting fibers, aggregates of fibers, and/or fiber-sized pieces of the fibrous cellulosic material may be fed to a settling zone (not shown), where the material is allowed to settle. Fines and dust present in the airspace above the settling fibers are drawn out of the settling zone and recycled or disposed.

Fibers, aggregates of fibers, and/or fiber-sized pieces of a fibrous cellulosic feed material from the fiberization zone 10, are fed to a mixing zone 12 which includes apparatus such as a blender. Optional ingredients such as odor counteractants (e.g. sodium bicarbonate, activated carbon, borax, quaternary ammonium bactericides, etc.), anti-static agents, flame retardants, fragrance, dyes, etc., can be added as desired at this point in the process to impart certain characteristics to the final product.

From mixing zone 12, the mixture of fibers, aggregates of fibers, and/or fiber-sized pieces of the fibrous cellulosic feed material are fed to a hydration zone 14 where it is thoroughly mixed with a sufficient amount of water for agglomeration. Warm water or steam, if available, may be preferable because it more readily softens cellulosic fibers. The moisture content of the blended material leaving the mixing zone should be in the range of from about 50 to about 80 weight percent based on the air dry weight of the cellulosic fibers, but the precise level must be optimized for the specific feed material and specific agglomeration methods to be used. At this stage of the process, the moist blended material can exhibit a degree of agglomeration, although on the whole, the material can be described as a very loose, crumbly mass with little individual particle integrity.

The hydrated mixture is then fed to an agglomeration zone 20 where the size of the mixture particles is increased by rolling the particles. Agglomeration can be accomplished in any suitable rotating device, such as a rotating disc-type agglomerator or a horizontal rotating drum. A substantially horizontal rotating drum is preferred because it is less expensive and provides improved agglomeration while simultaneously compacting the surface of the particles to form a densified skin as will hereinafter be described. This motion increases the exposure of the growing particles to the fibers, aggregates or fibers, and/or fiber-sized pieces of the fibrous cellulosic feed material, thereby affording an opportunity for intimate contact and growth by mechanical intertwining of fibers and adhesion. It has been found that when the proper moisture level is achieved for any given blend of such fibrous cellulosic material, agglomeration occurs very readily. As the moisture level of the blend is increased still further, larger agglomerated particles can be formed. If too much moisture is present, a slurry will result instead of agglomeration. The agglomerated particle size can be somewhat controlled by the moisture level.

The particles leaving the agglomerating zone 20 typically have a moisture content not exceeding about 80 weight percent. The particle typically has a size ranging from about 1/32 to about ⅝ inch in diameter and a generally spherically shape. Large particles are preferably recycled because they are too large for cat litter and are difficult to dry relative to the smaller particles.

The particles of acceptable size are then directed to a hot air fluidized bed dryer in a first drying zone 22 to compact or further compact the surfaces of the particles and to reduce the moisture content suitably for bead separation. Hot air used in the dryer enters at about 300°-700° F.

The agglomerated particles may contain large numbers of protruding fiber ends and/or fibrils. These exposed fiber ends and fibrils are undesirable if the particles are to be ultimately used as a cat litter because they cause the particles to cling to the cat's fur and therefore can be tracked away from the litter box. Therefore it is necessary that the surfaces of the agglomerated particles be substantially smooth. One way of accomplishing this is to compact the surface of the particles in the drying zone 22 by rolling or bouncing the moist particles in a vibrating fluidized bed dryer. The surfaces of the particles are compacted while being only partially dried. The same surface compaction can be also accomplished, for example, in a substantially horizontal rotating drum.

Compaction imparts a smoother surface to the particles and also gives the particles a more dense skin which resists dust formation and preserves particle integrity when heavily moistened. It also forms a particle which, when flattened has an improved smoother perimeter, thus enhancing antistickiness, stability and absorptive abilities.

The surface-compacted agglomerated particles leaving the first drying zone 22 typically have a moisture content of about 15 to about 50 weight percent. A preferred moisture content ranges from about 45 to about 50 weight percent permits good surface compaction and still retains particle integrity during subsequent processing. The shape of the agglomerated particles at this state of the process is generally spherical, although bumpy and irregular. The surfaces of the bumps, however, are smooth. The surface-compacted agglomerated particles are fed to a separator zone 24 where they are screened to remove any particles of unwanted size, large or small.

The acceptable particles are then directed to a second drying zone 26, such as a second vibrating fluidized bed dryer, in which the particles are dried to a moisture content of about 20 weight percent or less, preferably about 8 to about 13 weight percent, to inhibit bacterial growth which is enhanced by higher moisture levels.

If desired, the dried particles are preferably allowed to equibrate for at least about 1 hour before being fed to the flattening zone 28. In the flattening zone 28, the spherical beads are fed through a pair of rollers to be flattened to the desired thickness. From the flattener zone 28, the particles may be further dried directly or allowed to dry after packaging in packing zone 30.

As previously mentioned, agglomerated particles of this invention are lightweight and highly absorbent. These properties can vary, of course, depending upon the nature of the raw feed material, the processing conditions, the presence of additives, etc. In addition, for use as a cat litter, the particles of this invention are relatively dust-free and attrition resistant when compared to commercially available clay-based cat litters which tend to disintegrate in transit to form objectionable fines.

The following Examples were conducted on various types of material shown in Table 1 below.

TABLE 1

| Type | |
|---|---|
| Tidy Cat 3 | 1 |
| Jonny Cat | 2 |
| Kitty Litter | 3 |
| Fresh Step | 4 |
| Litter Green | 5 |
| Particles of this Invention | 6 |

EXAMPLE I

A test was designed to measure the amount of dust generated by pouring a bag of cat litter particles into a litter box. The measured weight, in grams, of dust collected is referred to as the "Dust Level Index". A 22 inches×15 inches×5 inches high plastic cat litter box was fitted with a plexiglass cover measuring 22 inches×15 inches×7 inches high. The cover was provided with a hole at one end measuring 6 inches in diameter. A high volume air sampler (a Fixt Flo air sampler manufactured by Mine Safety Appliances, Inc.) containing a tared glass fiber filter was fitted to the hole. The opposite end of the cover was provided with a series of small holes to permit air flow across the interior volume of the assembly from one end to the other. The top of the cover was also provided with an 8 inch diameter hole for pouring in the test sample. When conducting a test, the air sampler was first turned on. The volumetric flow rate of air through the sampler was 21.6 cubic feet per minute. 368 cubic inches of sample particles to be tested were poured into the litter box through the 8 inch hole in the top of the cover and the litter was spread evenly over the bottom of the litter box by hand. The top hole was covered. The air sampler was run for 5 minutes for each sample and all airborne dust was collected. The filters in the sampler were desicated overnight and weighted to determine the amount of dust collected. The results are shown in Table 2 below.

TABLE 2

| Type | Dust collected, g |
|---|---|
| 1 | 276 |
| 6 | 4 |

Hence the Dust Level Index for the particles of this invention was 60-fold less than the Dust Level Index for the commercially available clay litter. In general, the particles of this invention will exhibit a Dust Level Index of about 10 or less, preferably less than about 5.

EXAMPLE II

A test was designed to simulate the moisture evaporation rate from a litter box. Five $19\times13\frac{1}{2}\times5$ inch plastic litter boxes were each filled with 368 $in^3$ of clay litter. 500 ml of water were added to each litter box; 100 ml in each of the four corners and the remaining 100 ml in the center of the litter box. Each litter box was then weighed. The litter boxes were reweighed after 24 hours. The results are shown in Table 3 below.

TABLE 3

| Type | Weight loss rate, #/hr |
|---|---|
| 5 | .001 |
| 3 | .0025 |
| 1 | .0025 |
| 2 | .0015 |
| 6 | .0045 |

The evaporation rate after 1 day was 2 to $3\frac{3}{4}$ times greater for the litter of this application than the clay litters and $4\frac{1}{2}$ times the alfalfa based litter.

EXAMPLE III

An attrition test was performed to evaluate the effects of shipping on packaged litter's size distribution. One thousand grams were taken from the bottom of 363 $in^3$ packages of particle types 1, 3, 4 and 6 and sifted to obtain a size distribution and then re-packaged. All five bags of each type were then placed in baler bag overwraps and shaken on an attrition tester for a period equivalent to a trip of 1000 miles. All bale bags were positioned "flat" to the shaker. After the shipping simulation, each bag was re-sifted to determine the size distribution. Standard U.S. sieves 4, 6, 8, 10, 12, 18, 140 and bottom pan were utilized. The results are shown in Table 4 below and include the weight percent before and after the test.

TABLE 4

| Sieve No. | Type 6 | Type 4 | Type 3 | Type 1 |
|---|---|---|---|---|
| #4 | 1.3/1.3% | 1.0/0.5% | 0.4/0.1% | 0.4/0% |
| #6 | 38.4/38.8% | 14.4/9.7% | 26.8/18.1% | 13.9/7.1% |
| #8 | 38.2/36.6% | 22.5/16.6% | 34.9/32.0% | 26.1/17.5% |
| #10 | 11.6/12.7% | 10.1/9.7% | 11.1/11.8% | 10.1/8.4% |
| #12 | 6.4/6.4% | 8.5/8.1% | 7.1/8.3% | 6.9/6.8% |
| #18 | 4.1/4.4% | 24.0/25.6% | 12.7/15.1% | 16.0/18.2% |
| #140 | 0.1/0.1% | 18.3/28.6% | 6.5/13.3% | 26.3/41.5% |
| Bottom | 0/0% | 0.6/1.0% | 0.1/0.6% | 0.1/0.4% |

Clay-based litters Types 4, 3 and 1 appear to disintegrate in the attrition test. The amount passing through sieve #18 and retained on sieve #140 increases, often by 100% of pre-sifted value for the clay litters. The amount retained on bottom pan which passed through sieve #140 increased by 100% to more than 300%. The change in size distribution for particles of this invention was minimal.

EXAMPLE IV

A bed stability test was devised having the following steps. Two round aluminum weighing pans having dimensions $2\frac{1}{2}$ inches in diameter by $\frac{1}{2}$ inch in height were filled without packing with particles of Type 1, 2, 3, 4 and 6. Each pan was leveled with a metal spatula. A metal cylinder was attached to the probe on a Fowler Ultra Digit micrometer. The micrometer was zeroed while the probe was rested on a platform and the readout mode was set to inches. The probe was then raised to the up position and one of the weighing pans was then inserted below the probe. The probe was then dropped off-center into the leveled sample and the readout recorded. The same pan was moved so that another off-center drop could be made. The probe was raised to the up position and dropped again. The readout was again recorded. The steps were repeated for the second pan sample. An x which represented the distance between the platform and the final resting height of the probe was calculated for each drop. Therefore, the larger the x reading, the more stable the bed. The average x for all four drops is shown in Table 5 below.

TABLE 5

| Particle Type | x, inch |
|---|---|
| 6 | .6268 |
| 1 | .5912 |
| 2 | .4742 |
| 3 | .6330 |
| 4 | .6271 |

The particles of this invention, Type 6, as shown produce as stable a bed as do the clay litters, Type 1, 2, 3, and 4.

The foregoing description and examples are intended as illustrative and are not limiting. Still other variations are possible without departing from the spirit and scope of the present invention. The invention is defined by the claims which follow.

We claim:

1. A particle having a compacted outer surface comprises fibrous cellulosic material and has a bulk density of about 0.15 to about 0.9 kg. per liter.

2. The particle of claim 1 wherein the greatest dimension of said material is less than about 0.25 inch.

3. The particle of claim 2 wherein said particle is substantially free of protruding fibrils.

4. The particle of claim 1 having a platelet-like shape.

5. The particle of claim 1 wherein the ratio of z dimension to x dimension of said particle is from about 0.06:1 to about 0.6:1.

6. The particle of claim 5 where said z/x ratio ranges from about 0.15:1 to about 0.5:1.

7. The particle of claim 1 wherein the size of said particle ranges from about 0.03 inch to about 0.5 inch.

8. The particle of claim 7 wherein said particle size ranges from about 0.6 to about 0.25 inch.

9. The particle of claim 1 wherein about 98 weight percent of said particles pass a U.S. Sieve #4 and less than about 0.1 weight percent pass through a U.S. Sieve #18.

10. The particle of claim 1 wherein said particle is attrition resistant.

11. The particle of claim 10 wherein less than about 2 percent of said particles are attrited during a 1000 mile attrition test to the next smaller U.S. Sieve number.

12. The particle of claim 11 wherein said attrition test does not produce a measurable increase in said particles retained on a U.S. Sieve #140 or smaller.

13. The particle of claim 1 having a Dust Level Index of about 10 or less.

14. The particle of claim 1 wherein said particle remains discrete following wetting.

15. The particle of claim 1 wherein the ratio of x-dimension to y-dimension is not greater than about 3:1.

16. The particle of claim 4 wherein said particle is generally circular.

17. The particle of claim 1 wherein the 24-hour evaporation rate of said particle is about two times that of clay litters.

18. The particle of claim 17 wherein the 24-hour aqueous evaporation rate of said particle is at least about 0.0040#/hr.

19. The particle of claim 1 wherein said particle is particularly useful of oil sorption in the substantial absence of dust.

20. The particle of claim 19 wherein said particle sorbs oil to at least 75 percent of its weight.

21. A bed of particles comprising fibrous cellulosic material, said particles having a compacted outer surface and a bulk density of 0.15 to about 0.9 kg. per liter.

22. The bed of claim 21 wherein said particles have platelet-like shape.

23. The bed of claim 21 wherein the greatest dimension of said material is less than about 0.25 inch.

24. The bed of claim 21 wherein said particles are substantially free of protruding fibrils.

25. The bed of claim 24 wherein said bed has a Dust Level Index of about 10 or less.

26. The bed of claim 21 wherein the ratio of z dimension to x dimension of said particle is from about 0.06:1 to about 0.6:1.

27. The bed of claim 26 where said z/x ratio ranges from about 0.15:1 to about 0.5:1.

28. The bed of claim 21 wherein the size of said particle ranges from about 0.03 inch to about 0.5 inch.

29. The bed of claim 28 wherein said particle size ranges from about 0.6 to about 0.25 inch.

30. The bed of claim 21 wherein said particles comprise about 98 weight percent which pass a U.S. Sieve #4 and less than about 0.1 weight percent pass through a U.S. Sieve #18.

31. The bed of claim 21 wherein said particles are attrition resistant.

32. The bed of claim 31 wherein less than about 2 percent of said particles are attrited during a 1000 mile attrition test to the next smaller U.S. Sieve number.

33. The bed of claim 32 wherein said attrition test does not produce a measurable increase in said particles retained on a U.S. Sieve #140 or smaller.

34. The bed of claim 21 wherein said particles remain discrete following wetting.

35. The bed of claim 21 wherein the ratio of x-dimension to y-dimension is not greater than about 3:1.

36. The bed of claim 22 wherein said particles are generally circular.

37. The bed of claim 1 wherein the 24-hour evaporation rate of said particles is about two times that of clay litter.

38. The bed of claim 19 wherein the 24-hour aqueous evaporation rate of said particles is at least about 0.0040#/hr.

39. The bed of particles of claim 21 wherein said bed is as stable as clay litter.

* * * * *